United States Patent
Devarakonda

(10) Patent No.: US 9,243,534 B2
(45) Date of Patent: Jan. 26, 2016

(54) GASEOUS REDUCTANT INJECTION CONTROL SYSTEM

(71) Applicant: General Electric Company, Schenectady, NY (US)

(72) Inventor: Maruthi Narasinga Rao Devarakonda, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 1 day.

(21) Appl. No.: 14/062,098

(22) Filed: Oct. 24, 2013

(65) Prior Publication Data

US 2015/0113962 A1 Apr. 30, 2015

(51) Int. Cl.
*F01N 3/00* (2006.01)
*F01N 3/02* (2006.01)
*F01N 3/10* (2006.01)
*F01N 3/20* (2006.01)
*F01N 3/18* (2006.01)
*F01N 9/00* (2006.01)
*F01N 13/00* (2010.01)

(52) U.S. Cl.
CPC *F01N 3/18* (2013.01); *F01N 3/103* (2013.01); *F01N 3/208* (2013.01); *F01N 3/2066* (2013.01); *F01N 9/005* (2013.01); *F01N 13/009* (2014.06); *F01N 2560/021* (2013.01); *F01N 2560/026* (2013.01); *F01N 2560/06* (2013.01); *F01N 2560/07* (2013.01); *F01N 2560/08* (2013.01); *F01N 2570/14* (2013.01); *F01N 2610/02* (2013.01); *F01N 2610/06* (2013.01); *F01N 2900/0416* (2013.01); *F01N 2900/1402* (2013.01); *F01N 2900/1404* (2013.01); *F01N 2900/1406* (2013.01); *F01N 2900/1411* (2013.01)

(58) Field of Classification Search
CPC ....... F01N 9/00; F01N 3/2066; F01N 13/009; Y02T 10/24; Y02T 10/47
USPC ........... 60/274, 277, 286, 295, 297, 299–302, 60/311
See application file for complete search history.

(56) References Cited

U.S. PATENT DOCUMENTS 8,230,677 B2 7/2012 Devarakonda et al.
8,418,442 B2 4/2013 Lepreux et al.
(Continued)

FOREIGN PATENT DOCUMENTS

WO 2009135016 A2 11/2009

OTHER PUBLICATIONS

European Patent Office, European Search Report for Application No. EP2865859 dated Mar. 4, 2015, 3 pages.

*Primary Examiner* — Audrey K Bradley
*Assistant Examiner* — Dapinder Singh
(74) *Attorney, Agent, or Firm* — Hoffman Warnick LLC; Ernest G. Cusick

(57) ABSTRACT

A gaseous reductant injection control system for exhaust aftertreatment is disclosed. In one embodiment, a selective catalytic reduction (SCR) catalyst is in fluid communication with an exhaust stream generated from an engine. An oxidation catalyst (OC) is upstream of the SCR catalyst and in fluid communication with the exhaust stream. A gaseous reductant injector is upstream of the SCR catalyst and downstream of the OC and in fluid communication with the exhaust stream. A first gas sensor is upstream of the OC and a second gas sensor is downstream of the SCR catalyst. A controller receives signals representative of gas concentrations detected in the exhaust stream by the first gas sensor and the second gas sensor, and estimates concentrations of nitric oxide (NO) and nitride dioxide ($NO_2$) in the exhaust stream therefrom.

20 Claims, 2 Drawing Sheets

(56) References Cited

U.S. PATENT DOCUMENTS

| | | |
|---|---|---|
| 2004/0098968 A1 | 5/2004 | van Nieuwstadt et al. |
| 2005/0282285 A1* | 12/2005 | Radhamohan et al. ......... 436/55 |
| 2010/0242438 A1* | 9/2010 | Mital .............................. 60/274 |
| 2010/0275583 A1* | 11/2010 | Farrell et al. .................... 60/285 |
| 2011/0023591 A1 | 2/2011 | Dobson et al. |
| 2011/0314793 A1 | 12/2011 | Mullins et al. |

* cited by examiner

GASEOUS REDUCTANT INJECTION CONTROL SYSTEM

BACKGROUND OF THE INVENTION

The present invention relates generally to reducing pollutant emissions from combustion processes, and more particularly, to a gaseous reductant injection control system for exhaust aftertreatment of nitrogen oxide ($NO_x$) or ammonia ($NH_3$) emissions generated from a lean-burn engine.

Lean-burn engines, such as those used by diesel-powered and natural gas-powered vehicles, equipment, and generators combust at high air-to-fuel ratios in comparison with rich-burn engines. By nature, lean-burn engines use less fuel while producing equivalent power of similar-sized rich-burn engines. However, lean-burn engines have increased $NO_x$ and $NH_3$ emissions generally due to slow burn rates associated with the lean mixtures of fuel (i.e., excess air introduced with the fuel). Aftertreatment options are typically used to reduce $NO_x$ and $NH_3$ emissions from the exhaust of the lean-burn engines.

BRIEF DESCRIPTION OF THE INVENTION

In one aspect of the present invention, a system is provided. In this aspect of the present invention, the system comprises an engine. A selective catalytic reduction (SCR) catalyst is in fluid communication with an exhaust stream generated from the engine. An oxidation catalyst (OC) is upstream of the SCR catalyst and in fluid communication with the exhaust stream. A gaseous reductant injector, upstream of the SCR catalyst and downstream of the OC, is in fluid communication with the exhaust stream. A first gas sensor is upstream of the OC and a second gas sensor is downstream of the SCR catalyst. A controller is operatively connected to the first gas sensor, the second gas sensor and the gaseous reductant injector. The controller receives signals representative of gas concentrations detected in the exhaust stream by the first gas sensor and the second gas sensor, estimates concentrations of nitric oxide (NO) and nitride dioxide ($NO_2$) in the exhaust stream according to the gas concentrations detected by the first gas sensor and the second gas sensor, and determines a flow rate of a gaseous reductant to be injected into the exhaust stream by the gaseous reductant injector based on the NO and $NO_2$ estimates.

In another aspect of the present invention, a urea injection control system for exhaust aftertreatment of exhaust gas generated from an engine is provided. In this aspect of the present invention, the system comprises a selective catalytic reduction (SCR) catalyst in fluid communication with the exhaust gas. An oxidation catalyst (OC) is in fluid communication with the exhaust gas upstream of the SCR catalyst. A urea solution injector, upstream of the SCR catalyst and downstream of the OC, injects urea in the exhaust gas. A first gas sensor upstream of the OC detects gas concentrations in the exhaust gas. A second gas sensor downstream of the SCR catalyst detects gas concentrations in the exhaust gas. A plurality of sensors in fluid communication with the exhaust stream detects operating conditions out of the engine. A controller is operatively connected to the first gas sensor, the second gas sensor, the plurality of sensors and the urea solution injector. The controller estimates concentrations of nitric oxide (NO) and nitride dioxide ($NO_2$) in the exhaust gas according to the gas concentrations detected by the first gas sensor and the second gas sensor and the operating conditions detected by the plurality of sensors. The controller determines a flow rate of the urea injected into the exhaust gas by the urea solution injector based on the NO and $NO_2$ estimates and the detected operating conditions.

DETAILED DESCRIPTION OF THE INVENTION

Various embodiments of the present invention are directed to estimating nitric oxide (NO), nitride dioxide ($NO_2$) and ammonia ($NH_3$) in exhaust gas generated from an engine such as a lean-burn engine in order to perform an aftertreatment on the exhaust such that nitrogen oxide ($NO_x$) and $NH_3$ emissions are reduced. In one embodiment, an exhaust stream generated from an engine is applied to an oxidation catalyst (OC) and a selective catalytic reduction (SCR) catalyst. A gaseous reductant injector injects a gaseous reductant into the exhaust stream between the OC and the SCR catalyst. Gas sensors located upstream of the OC and downstream of the SCR catalyst obtain measurements of the concentration of a gas in the exhaust stream. A controller, containing an estimator having models of the OC and the SCR catalyst, receives the gas concentration measurements along with other operating conditions out of the engine. In one embodiment, the estimator can estimate concentrations of NO and $NO_2$ in the exhaust stream based on the gas concentration measurements and the operating conditions. Since there currently are no sensors that are capable of measuring NO and $NO_2$, the estimation of these concentrations in the exhaust stream by the estimator is equivalent to virtual sensing of these gases. A control algorithm within the controller can then use the estimated NO and $NO_2$ concentrations to determine a flow rate of the gaseous reductant to be injected into the exhaust stream. The gaseous reductant injector then injects the gaseous reductant into the exhaust stream at the determined flow rate. In another embodiment, the estimator can estimate concentrations of $NH_3$ in the exhaust stream based on the gas concentration measurements and the operating conditions. A control algorithm within the controller can then use the estimated $NH_3$ concentrations to determine a flow rate of the gaseous reductant to be injected into the exhaust stream by the gaseous reductant injector.

Estimating NO, $NO_2$ and $NH_3$ concentrations in the exhaust stream in this manner enables the various embodiments of the present invention to provide an effective model-based gaseous reductant control strategy that facilitates optimal reduction of harmful emissions from the stream by an aftertreatment control system. As a result, the amount of sensors used in the aftertreatment control system can be minimized, lowering the operational costs associated with the control system. These technical effects are illustrative of some of the aspects associated with the various embodiments of the present invention and are not intended to be restrictive.

Figure 1:
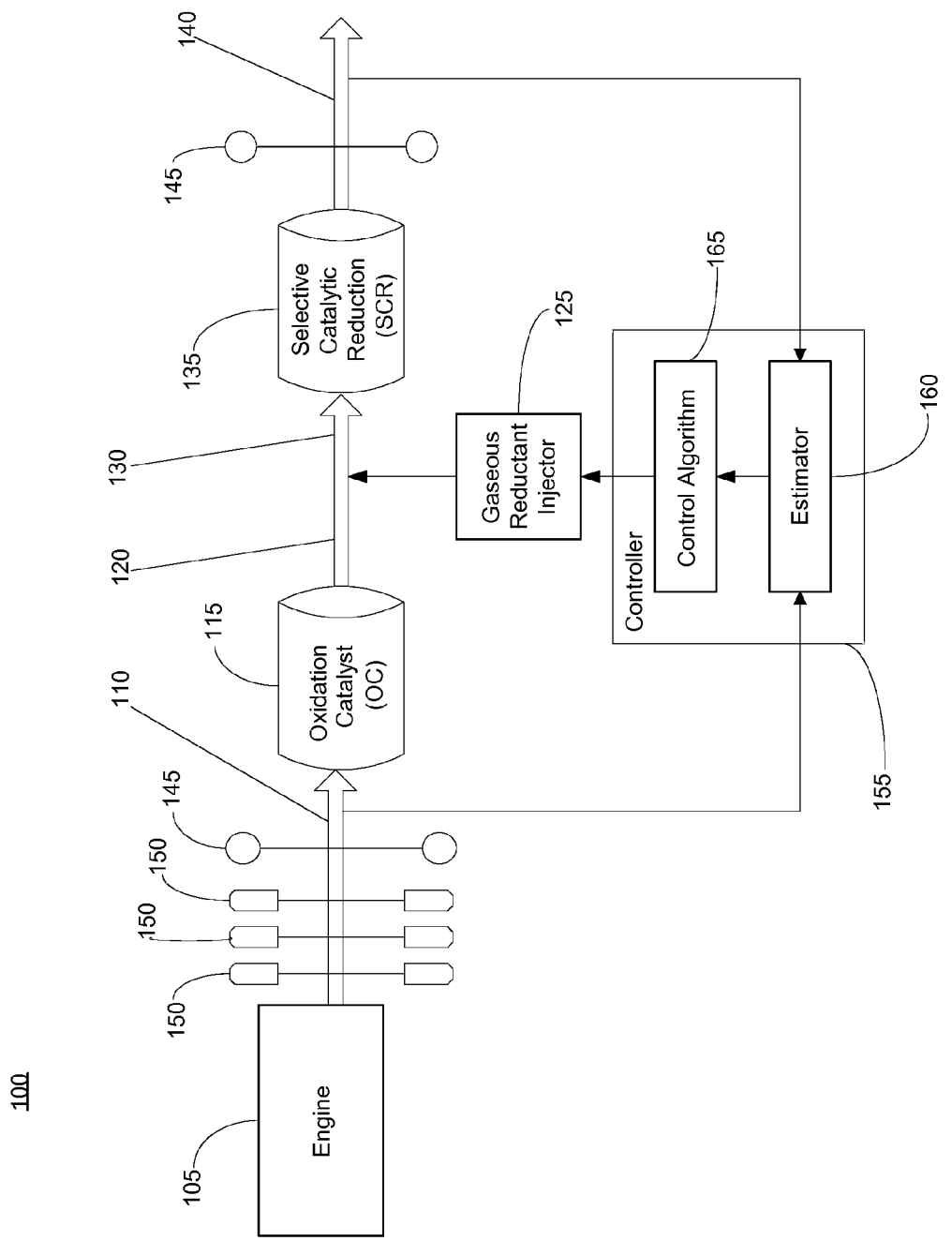
FIG. 1 is a schematic block diagram of a gaseous reductant injection control system for exhaust aftertreatment of an engine according to an embodiment of the present invention.

FIG. 1 is a schematic block diagram of a gaseous reductant injection control system 100 for an internal combustion engine 105 according to a first embodiment of the present invention. In one embodiment, engine 105 can be a lean-burn engine such as a diesel engine or a natural gas engine. As used herein, a lean-burn engine is any combustion system that has excess air or other diluents relative to the amount of fuel being combusted. Although the description that follows pertains to a gaseous reductant injection control system for exhaust aftertreatment in an internal combustion engine such as a lean-burn engine, it should be understood that the various embodiments of the present invention may be suitable for use with any lean burn combustion machine, including both stationary and mobile combustion machines, where exhaust is treated for emissions such as $NO_x$ and $NH_3$. Examples include lean burn gaseous-fueled reciprocating engines, lean burn liquid-fueled reciprocating engines such as diesel engines or other compression ignition or spark ignition engines, or gas turbines.

Engine 105 produces an exhaust stream 110 of gases that can contain nitrogen oxides ($NO_x$) including NO and $NO_2$ and $NH_3$. Exhaust stream 110 enters an OC 115 within gaseous reductant injection control system 100. OC 115 can oxidize carbon monoxide (CO) and hydrocarbons (HC) including a soluble organic fraction (SOF) of diesel particulate matter (PM) to carbon dioxide ($CO_2$) and water ($H_2O$), resulting in an oxidized exhaust stream 120. In one embodiment OC 115 can include a diesel oxidation catalyst (DOC).

In one embodiment, a gaseous reductant injector 125 injects a gaseous reductant into the oxidized exhaust stream 120 creating a reductant enriched exhaust stream 130 that facilitates a subsequent reduction reaction of the exhaust stream, where $NO_x$ is converted to nitrogen ($N_2$) and $H_2O$. In one embodiment, gaseous reductant injector 125 is a urea solution injector (e.g., a dosing module) that can inject a solution of urea ($NH_2CONH_2$) into oxidized exhaust stream 120 to produce a urea-enriched exhaust stream. The solution of urea can include an aqueous mixture of urea and $H_2O$. In operation, the urea solution injector can inject the urea solution into oxidized exhaust stream 120 through a pipe or conduit carrying the exhaust stream. The urea can then decompose into $NH_3$ and $CO_2$. The $NH_3$ and $CO_2$ can then mix with the exhaust stream to facilitate the subsequent reduction reaction of the exhaust stream where $NO_x$ is converted to $N_2$ and $H_2O$. It is understood that the use of urea as the gaseous reductant is only an example and it is not meant to limit the scope of the various embodiments of the present invention described herein. Those skilled in the art will appreciate that other gaseous reductants are suitable for use in the embodiments of the present invention such as, for example, $NH_3$.

As shown in FIG. 1, reductant enriched exhaust stream 130 enters a SCR catalyst 135 where a reduction reaction occurs causing the $NO_x$ to be converted to $N_2$ and $H_2O$. In one embodiment, SCR catalyst 135 can contain metal zeolites arranged in a honeycomb such that the passing exhaust gasses will interact with a multitude of catalytic sites. In this manner, reductant enriched exhaust stream 130 can be swept into SCR catalyst 135, where the gaseous reductant breaks down into $NH_3$ and $CO_2$. Once inside SCR catalyst 135, the nitrogen oxides react with $NH_3$ in the presence of the metal zeolite to produce nitrogen gas ($N_2$) and water vapor. A scrubbed exhaust stream 140 then exits SCR catalyst 135. In an embodiment where a urea solution is injected into the exhaust stream via urea solution injector, the urea-enriched exhaust can similarly be swept into SCR catalyst 135. The urea breaks down into $NH_3$ and $CO_2$. Inside SCR catalyst 135, the nitrogen oxides react with $NH_3$ in the presence of the metal zeolite to produce nitrogen gas and water vapor.

Although zeolite is described as a catalyst for facilitating the reduction reaction, those skilled in the art will appreciate that there are a number of known catalysts that may be used in the selective reduction process associated with SCR catalyst 135 to facilitate the conversion of $NH_3$ and $NO_x$ to nitrogen and $H_2O$. For example, the catalyst may include, but is not limited to, compounds of vanadium, iron, or copper, and base metal exchanged zeolites.

Gaseous reductant injection control system 100 can include gas sensors 145 located about the exhaust stream generated from engine 105. In one embodiment, a gas sensor 145 can be located upstream of OC 115 in order to measure gas concentrations detected in exhaust stream 110. Another gas sensor 145 can be located downstream of SCR catalyst 115 in order to measure gas concentrations detected in scrubbed exhaust stream 140. In one embodiment, gas sensors 145 may be $NO_x$ sensors. In another embodiment, gas sensors 145 may be $NH_3$ sensors that measure or detect concentration of ammonia in the exhaust stream. In still another embodiment, gas sensors 145 may be a combination of one $NO_x$ sensor and one $NH_3$ sensor. Those skilled in the art will appreciate that any gas sensor that is sensitive to one or more gases that are to be controlled by exhaust aftertreatment, including, but not limited to, NO, $NO_2$, or $NH_3$ is suitable for use with the various embodiments of the present invention.

Other sensors 150 are located about exhaust stream 110 at an engine out location. In particular, sensors 150 are in fluid communication with the exhaust stream, with each sensor detecting operating conditions out of engine 105. In one embodiment, sensors 150 can include a flow rate sensor that detects a flow rate of exhaust stream 110, a temperature sensor that detects a temperature of the exhaust gas and a pressure sensor that detects a pressure of the exhaust gas a flow rate. Those skilled in the art will appreciate that other sensors can be located about and in fluid communication with exhaust stream 110 to measure other operating conditions associated with the exhaust stream including reductant enriched exhaust stream 130 and scrubbed exhaust stream 140 (e.g., air-flow rate). Furthermore, there may be other sensors located about engine 105 to measure certain operating parameters (e.g., load, speed).

A controller 155 receives signals representative of gas concentrations detected in the exhaust stream by the gas sensors 145 and signals representative of the operating conditions detected by sensors 150. In one embodiment, controller 155 can use these signals to estimate concentrations of NO and $NO_2$ in the exhaust stream generated from engine 105, upstream of SCR catalyst 135. In another embodiment, controller 155 can use the signals to estimate concentrations of $NH_3$ in the exhaust stream generated from engine 105, upstream of SCR catalyst 135.

Controller 155 can then determine a flow rate of a gaseous reductant (e.g., urea-solution) to be injected into the exhaust stream by gaseous reductant injector 125 based on the NO and $NO_2$ estimates or the $NH_3$ estimates. Using the determined flow rate, controller 155 can then adjust the flow rate of gaseous reductant injected into oxidized exhaust stream 120. In particular, controller 155 can increase or decrease the rate at which the gaseous reductant (e.g., urea-solution) is injected into oxidized exhaust stream 120 to minimize NO, $NO_2$, $NH_3$ emissions in scrubbed exhaust stream 140. As a result, controller 155 can ensure that an optimal gaseous reductant injection rate is used while minimizing $NO_x$ and $NH_3$ emissions.

Controller 155 can include an estimator 160 or observer that receives the gas concentrations detected in the exhaust stream by gas sensors 145 and the operating conditions detected by sensors 150, and estimates the concentrations of NO, $NO_2$ and $NH_3$ in the exhaust stream. In one embodiment, estimator 160 can include an OC model that models the oxidation reactions in OC 115 in real-time and a SCR catalyst model that models the catalytic reactions in SCR catalyst 135 in real-time. Estimator 160 can also be configured to obtain an emissions model that models emission concentrations generated in the exhaust stream of engine 105. Those skilled in the art will appreciate that OC models, SCR catalyst models, and emissions models are well known in the art and can be embedded in estimator 160 using principles based in control and linear system theory.

In operation, the estimator 160 can apply the gas concentrations detected in the exhaust stream by gas sensors 145 and the operating conditions detected by sensors 150 to the OC model, SCR catalyst model and emissions model (or a map) to estimate the concentrations of NO and $NO_2$ in the exhaust stream. Estimator 160 can estimate the concentrations of NO and $NO_2$ in the exhaust stream because the math-based OC and SCR models model the relevant species concentration (NO, $NO_2$, $NH_3$) based on conservation of species, mass transfer and reaction chemistry. Based on the engine out and post-SCR out $NO_x$ sensor readings and relevant exhaust data such as mass flow rate and temperature as inputs, estimator 160 can provide the NO and $NO_2$ concentrations at the SCR inlet to gaseous reductant injector (e.g., urea injection control system.) U.S. Pat. No. 8,230,677 provides details of equations that can be used in the OC and SCR models deployed by estimator 160.

By operating in the aforementioned manner, estimator 160 can essentially act as a linear observer or a non-linear observer. That is, estimator 160 observes the gas concentrations generated from gas sensors 145 and the operating conditions generated from sensors 150, and uses the OC model, SCR catalyst model and the emissions model to generate estimates of NO, $NO_2$ and $NH_3$. In one embodiment, an extended Kalman filter could be used to implement a linear observer or a non-linear observer that estimates concentrations of NO, $NO_2$ and $NH_3$.

As shown in FIG. 1, controller 155 can further include a control algorithm 165 that receives the NO, $NO_2$ and $NH_3$ concentration estimates from estimator 160. Control algorithm 165 can then determine the flow rate of the gaseous reductant (e.g., urea solution) to be injected into the exhaust stream by gaseous reductant injector 125. In particular, control algorithm 165 can determine the flow rate by accounting for the NO, $NO_2$ and $NH_3$ states in the SCR catalyst that estimator 160 has estimated. Essentially, control algorithm 165 is determining an optimal amount of gaseous reductant that should be added to minimize $NO_x$ and $NH_3$ emissions in the exhaust stream. In this manner, controller 155 via control algorithm 165 can be used to increase or decrease the amount of gaseous reductant (e.g. urea) injected into the exhaust stream dependent on what conditions in the exhaust warrant.

Controller 155 may comprise an electronic or computer implemented device that includes control logic pertaining to the operation of the one or more valves. Pursuant to this control logic and/or one or more operating parameters monitored by controller 155, the controller can send electronic signals to gaseous reductant injector 125 and, thereby, control the flow rate that the gaseous reductant is injected into the exhaust stream.

In one embodiment, the processing operations performed by controller 155 may be implemented in the form of an entirely hardware embodiment or an embodiment containing both hardware and software elements. For example, a single special-purpose integrated circuit, such as an application specific integrated circuit (ASIC), having a main or central processor section for overall, system-level control, and separate sections dedicated to performing various different specific combinations, functions and other processes under control of the central processor section, can be used. Controller 155 may also be implemented using a suitably programmed general-purpose computer, such as a microprocessor or microcontroller, or other process device such as a central processing unit (CPU) or microprocessor unit (MPU), either alone or in conjunction with one or more peripheral data and signal processing devices. In general, any device or similar devices on which a finite state machine capable of implementing logic flow that represents the various process functions performed by controller 155 can be used. Controller 155 may also be implemented using a variety of separate dedicated or programmable integrated or other electronic circuits or devices, such as hardwired electronic or logic circuits, including discrete element circuits or programmable logic devices such as programmable logic devices (PLDs), programmable array logic devices (PALs), programmable logic arrays (PLAs), or the like.

In one embodiment, the processing functions performed by controller 155 may be implemented in software, which includes but is not limited to firmware, resident software, microcode, etc. Furthermore, the processing functions performed by controller 155 can take the form of a computer program product accessible from a computer-usable or computer-readable medium providing program code for use by or in connection with a computer or any instruction execution system (e.g., processing units). For the purposes of this description, a computer-usable or computer readable medium can be any computer readable storage medium that can contain or store the program for use by or in connection with the computer or instruction execution system.

The computer readable medium can be an electronic, magnetic, optical, electromagnetic, infrared, or semiconductor system (or apparatus or device). Examples of a computer-readable medium include a semiconductor or solid state memory, a random access memory (RAM), a read-only memory (ROM), a rigid magnetic disk and an optical disk. Current examples of optical disks include a compact disk-read only memory (CD-ROM), a compact disk-read/write (CD-R/W) and a digital video disc (DVD).

Figure 2:
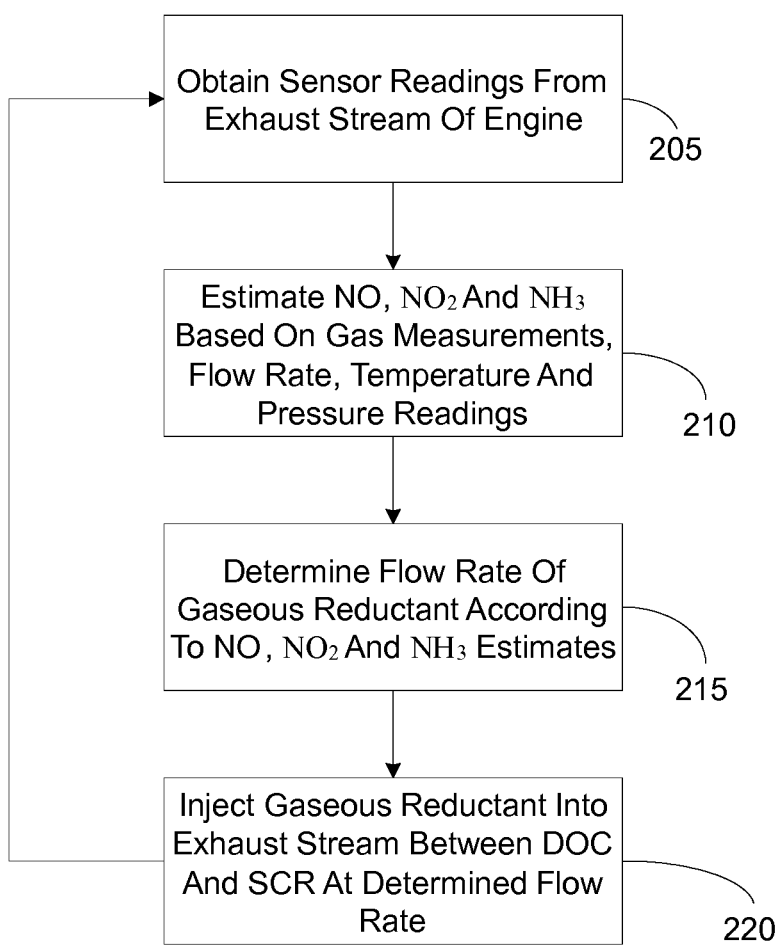
FIG. 2 is a flow diagram describing operation of the system depicted in FIG. 1 according to an embodiment of the present invention.

FIG. 2 is a flow diagram 200 describing operation of system 100 depicted in FIG. 1 according to an embodiment of the present invention. As shown in FIG. 2, sensor readings are obtained from the exhaust stream of the engine at 205. This can include obtaining gas concentrations obtained from gas sensors 145 and operating conditions from sensors 150 located out of engine 150 (FIG. 1).

Continuing with flow diagram 200, concentrations of NO, $NO_2$ and $NH_3$ are estimated at 210. This can include applying the data obtained from gas sensors 145 and sensors 150 to the OC model, SCR catalyst model and emissions concentration model stored in estimator 160 to estimate concentrations of NO, $NO_2$ and $NH_3$ in the manner described above.

The flow rate of gaseous reductant to be injected into the exhaust stream can then be determined 215. In particular, the estimated concentrations of NO NO, $NO_2$ and $NH_3$ can be used by control algorithm 165 (FIG. 1) to determine the flow rate of the gaseous reductant to be injected into the exhaust stream by the gaseous reductant injector 125 (FIG. 1).

Gaseous reductant injector 125 can then inject the gaseous reductant (e.g., urea) into the exhaust stream per the determined flow rate at 220. In this manner, the gaseous reductant can continually be increased, decreased or maintained at its current rate if conditions do not warrant a change in flow rate. As a result, an optimal amount of gaseous reductant is being injected into the exhaust stream that facilitates minimization of $NO_x$ and $NH_3$ emissions.

The foregoing flow chart of FIG. 2 shows some of the processing functions associated with using gaseous reductant injection control system 100. In this regard, each block in the figure represents a process act associated with performing the functions exhaust aftertreatment system 100. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added.

As described herein, the various embodiments of the present invention provide a system for minimizing $NO_x$ and $NH_3$ emissions from combustion processes while minimizing the consumption of a gaseous reductant such as a urea solution. In particular, the various embodiments of the present invention are directed to estimating NO, $NO_2$ and $NH_3$ concentrations in the exhaust stream in order to determine an optimal amount of gaseous reductant to be injected into the exhaust stream. This translates to a reduction of harmful emissions that can be removed by an exhaust aftertreatment control system.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises," "comprising," "includes," "including," and "having," when used in this specification, specify the presence of stated features, integers, steps, operations, elements, and/or components, but do not preclude the presence or addition of one or more other features, integers, steps, operations, elements, components, and/or groups thereof. It is further understood that the terms "front" and "back" are not intended to be limiting and are intended to be interchangeable where appropriate.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. An aftertreatment system for an engine, the aftertreatment system comprising:
   a selective catalytic reduction (SCR) catalyst in fluid communication with an exhaust stream generated from the engine;
   an oxidation catalyst (OC), upstream of the SCR catalyst and in fluid communication with the exhaust stream;
   a gaseous reductant injector, upstream of the SCR catalyst and downstream of the OC, and in fluid communication with the exhaust stream;
   a first gas sensor upstream of the OC;
   a second gas sensor downstream of the SCR catalyst;
   a controller, operatively connected to the first gas sensor, the second gas sensor and the gaseous reductant injector, wherein the controller receives signals representative of combined gas concentrations detected in the exhaust stream by the first gas sensor and the second gas sensor, estimates individual species concentrations of nitric oxide (NO) and nitrogen dioxide ($NO_2$) in the exhaust stream according to the combined gas concentrations detected by the first gas sensor and the second gas sensor, and determines a flow rate of a gaseous reductant to be injected into the exhaust stream by the gaseous reductant injector based on the individual NO and $NO_2$ species concentration estimates, wherein the combined gas concentrations detected by the first gas sensor and the second gas sensor each comprise a combined concentration of NO, $NO_2$, and gases other than NO and $NO_2$ in the exhaust stream.

2. The aftertreatment system according to claim 1, wherein the first gas sensor and the second gas sensor comprises one of a nitrogen oxide ($NO_x$) sensor, an ammonia sensor, and combinations thereof.

3. The aftertreatment system according to claim 1, wherein the controller is further configured to estimate concentrations of ammonia ($NH_3$) in the exhaust stream according to the gas concentrations detected by the first gas sensor and the second gas sensor.

4. The aftertreatment system according to claim 1, wherein the gaseous reductant injector is a urea solution injector.

5. The aftertreatment system according to claim 1, wherein the engine comprises a lean-burn engine.

6. The aftertreatment system according to claim 1, wherein the controller comprises an OC model and a SCR catalyst model.

7. The aftertreatment system according to claim 6, wherein the controller is configured to obtain an emissions model representative of emission concentrations generated in the exhaust stream of the engine.

8. The aftertreatment system according to claim 7, further comprising a plurality of sensors in fluid communication with the exhaust stream each detecting operating conditions of the engine, wherein the operating conditions include a speed of the engine and a loading of the engine.

9. The aftertreatment system according to claim 8, wherein the plurality of sensors include a speed sensor, a flow rate sensor, a temperature sensor and a pressure sensor.

10. The aftertreatment system according to claim 8, wherein the controller estimates the NO and $NO_2$ concentrations according to the gas concentrations detected by the first gas sensor and the second gas sensor and the operating conditions of the engine detected by the plurality of sensors.

11. A urea injection control system for exhaust aftertreatment of exhaust gas generated from an engine, comprising:
    a selective catalytic reduction (SCR) catalyst in fluid communication with the exhaust gas;
    an oxidation catalyst (OC) in fluid communication with the exhaust gas upstream of the SCR catalyst;
    a urea solution injector, upstream of the SCR catalyst and downstream of the OC, that injects urea in the exhaust gas;
    a first gas sensor upstream of the OC that detects combined gas concentrations in the exhaust gas;
    a second gas sensor downstream of the SCR catalyst that detects combined gas concentrations in the exhaust gas;
    a plurality of sensors in fluid communication with the exhaust stream that detect operating conditions out of the engine; and
    a controller, operatively connected to the first gas sensor, the second gas sensor, the plurality of sensors and the urea solution injector, wherein the controller estimates individual species concentrations of nitric oxide (NO) and nitrogen dioxide ($NO_2$) in the exhaust gas according to the combined gas concentrations detected by the first gas sensor and the second gas sensor and the operating conditions detected by the plurality of sensors, the controller determining a flow rate of the urea injected into the exhaust gas by the urea solution injector based on the individual NO and $NO_2$ species concentration estimates and the detected operating conditions, wherein the combined gas concentrations detected by the first gas sensor and the second gas sensor each comprise a combined concentration of NO, $NO_2$, and gases other than NO and $NO_2$ in the exhaust stream.

12. The system according to claim 11, wherein the first gas sensor and the second gas sensor comprises one of a nitrogen oxide ($NO_x$) sensor, an ammonia sensor, and combinations thereof.

13. The system according to claim 11, wherein the plurality of sensors include a flow rate sensor that detects a flow rate of the exhaust gas, a temperature sensor that detects a temperature of the exhaust gas and a pressure sensor that detects a pressure of the exhaust gas.

14. The system according to claim 13, wherein the controller estimates the NO and $NO_2$ concentrations according to the gas concentrations detected by the first gas sensor and the second gas sensor, the flow rate of the exhaust gas, the temperature of the exhaust gas and the pressure of the exhaust gas.

15. The system according to claim 11, wherein the controller is further configured to estimate concentrations of ammonia ($NH_3$) in the exhaust stream according to the gas concentrations detected by the first gas sensor and the second gas sensor.

16. The system according to claim 15, wherein the controller comprises a control algorithm that receives the $NH_3$ concentration estimates and determines the flow rate of the urea to be injected into the exhaust gas by the urea solution injector.

17. The system according to claim 11, wherein the controller comprises an estimator having an OC model and a SCR catalyst model.

18. The system according to claim 17, wherein the estimator is configured to obtain an emissions model representative of emission concentrations generated in the exhaust gas of the engine.

19. The system according to claim 17, wherein the estimator is one of a linear observer and a non-linear observer.

20. The system according to claim 17, wherein the controller comprises a control algorithm that receives the NO and $NO_2$ concentration estimates from the estimator and determines the flow rate of the urea to be injected into the exhaust gas by the urea solution injector.

* * * * *